(12) United States Patent
Ichikawa

(10) Patent No.: US 6,926,964 B2
(45) Date of Patent: Aug. 9, 2005

(54) FUEL TANK FOR MOTOR VEHICLE AND METHOD FOR PRODUCING THE SAME

(75) Inventor: Yoshio Ichikawa, Kanagawa (JP)

(73) Assignee: Kabushiki Kaisha Nippankenkyusho, Kanagawa (JP)

( * ) Notice: Subject to any disclaimer, the term of this patent is extended or adjusted under 35 U.S.C. 154(b) by 0 days.

(21) Appl. No.: 10/733,575

(22) Filed: Dec. 12, 2003

(65) Prior Publication Data

US 2004/0213929 A1 Oct. 28, 2004

(30) Foreign Application Priority Data

Apr. 18, 2003 (JP) ........................................ 2003-114241

(51) Int. Cl.⁷ ........................ B32B 15/02; B32B 19/00; B32B 21/02; B32B 23/02; B32B 27/02
(52) U.S. Cl. ...................... 428/403; 428/407; 427/181; 427/191; 427/192; 427/201; 427/205; 427/216; 427/217; 427/230
(58) Field of Search .............................. 428/34.1, 35.7, 428/35.8, 36.9, 402, 403, 407; 208/133, 134, 135; 427/181, 189, 191, 192, 201, 205, 215, 216, 217, 230; 502/31

(56) References Cited

U.S. PATENT DOCUMENTS 5,433,841 A * 7/1995 Ichikawa .................... 208/134

FOREIGN PATENT DOCUMENTS

| EP | 0 916 746 A | | 5/1999 | |
|----|----|----|----|----|
| GB | 2317921 | * | 8/1998 | .......... F02M/27/02 |
| JP | 60 161460 A | | 8/1985 | |
| JP | 2002 105615 A | | 4/2002 | |
| WO | WO 02/20874 A | | 3/2002 | |

* cited by examiner

Primary Examiner—Michael C. Miggins
(74) Attorney, Agent, or Firm—Sughrue Mion, PLLC

(57) ABSTRACT

Disclosed is a fuel tank for a motor vehicle whose inner face is processed with an inorganic coating agent comprising (A) fine particles carrying silver and/or copper and (B) inorganic fine particles, and the tank inhibits oxidation of the fuel such as gasoline or light oil, and further decreases the cluster of gasoline or light oil to make finer the particle size of atomized fuel, thereby improving ignitionability and combustibility, which makes it possible to decrease imperfect combustion and to decrease substantially the consumption of the fuel.

17 Claims, No Drawings

FUEL TANK FOR MOTOR VEHICLE AND METHOD FOR PRODUCING THE SAME

BACKGROUND OF THE INVENTION

The present invention relates to a fuel tank for a motor vehicle and a method for producing the same. More particularly, the present invention relates to a fuel tank which decreases the cluster of gasoline used in a gasoline tank or light oil used in a diesel engine, inhibits oxidation, and makes finer the particle size of the fuel sprayed into the engine to improve ignitionability and combustibility, thereby substantially inhibiting the generation of hydrocarbons (HC) which increase by imperfect combustion particularly in high speed traveling, decelerating and idling in the case of the gasoline engine, and in an engine load factor of 50% or more in the case of the diesel engine, which allows the consumption of the fuel to decrease by 3 to 30% and also allows the emission of pollutants to decrease; and a method for producing the same.

The combustion process of a motor vehicle engine comprises a repetition of fuel aspiration→compression→explosion→exhaust.

A gasoline engine aspirates an atomized mixed gas of gasoline and air into a cylinder, compresses it, explosively combusts it with sparks of a spark plug, and exhausts an exhaust gas out of the cylinder.

Further, a diesel engine first aspirates only air into a cylinder, compresses it and elevates its temperature, ejects atomized light oil at high pressure, combusts the oil by spontaneous ignition, and exhausts an exhaust gas out of the cylinder.

As methods for enhancing perfect combustion of theses motor vehicle fuels, there have hitherto been disclosed the use of fuel oil additives such as an antioxidant, a metal deactivator agent and a detergent-dispersant, or solid catalysts placed in a fuel tank. However, all of them do not produce sufficient effects, or cause problems such as high cost.

SUMMARY OF THE INVENTION

An object of the present invention is to provide a fuel tank for a motor vehicle which inhibits oxidation of a fuel, and further decreases the cluster of gasoline or light oil to make finer the particle size of atomized fuel, there by improving ignitionability and combustibility, which makes it possible to decrease imperfect combustion and to decrease substantially the consumption of the fuel. Another object of the present invention is to provide a method for producing the same.

More specifically, an object of the present invention is to provide a fuel tank for a motor vehicle, in which a coating agent of the present invention is applied onto an inner face of the fuel tank, dried and cured to form a coating film, and a fuel such as gasoline or light oil comes into contact with the coating film to inhibit initial oxidation of the fuel and decrease the cluster thereof, thereby forming a finer atomized mixed gas of gasoline and air in the case of gasoline and further inhibiting oxidation which rapidly proceeds to improve ignitionability and combustibility, thus substantially inhibiting the generation of hydrocarbons, which allows the consumption of the fuel to decrease by 3 to 30% and also allows the emission of pollutants to decrease. Further, another object of the present invention is to provide a method for producing the same.

According to the present invention, there is provided a fuel tank for a motor vehicle whose inner face is processed with an inorganic coating agent comprising (A) fine particles carrying silver and/or copper and (B) inorganic fine particles.

Further, according to the present invention, there is provided a method for producing a fuel tank for a motor vehicle, which comprises applying the above-mentioned inorganic coating agent onto an inner face of the fuel tank, followed by drying and curing.

DESCRIPTION OF THE PREFERRED EMBODIMENTS

Inorganic Coating Agent

An inorganic coating agent applied onto the fuel tank for a motor vehicle of the present invention comprises (A) fine particles carrying silver and/or copper, and (B) inorganic fine particles.

(A) Fine Particles Carrying Silver and/or Copper

In the present inventions, the fine particles carrying silver and/or copper, which are used as ingredient (A), are preferably granular or fibrous, and include fine particles of an aluminosilicate, a phosphate, a silicate, a carbonate, a metal oxide, a metal hydroxide, a metal nitride and a metal carbide. They may be used either alone or as a combination of two or more of them. The average particle size of the fine particles is preferably 0.01 to 15 $\mu$m, and more preferably about 0.1 to about 3 $\mu$m. Less than 0.01 $\mu$m is unfavorable, because silver and copper are difficult to be carried, and their functions are difficult to be exhibited. On the other hand, exceeding 15 $\mu$m is unfavorable, because the adhesion is lowered, and the surface area becomes too small.

Specific examples of the above-mentioned fine particles include fine particles or fibrous ones of zeolite, calcium phosphate, zirconium phosphate, silica gel, calcium silicate, aluminum silicate, magnesium silicate, calcium carbonate, magnesium carbonate, titanium oxide, zinc oxide, potassium titanate (whisker), aluminum hydroxide, zirconium hydroxide, silicon nitride and silicon carbide.

As zeolite used herein, both natural zeolite and synthetic zeolite can be used.

Natural zeolite includes analcime, chabasite, clinoptilolite, eriolite, forgeasite and mordenite. On the other hand, synthetic zeolite includes A-zeolite, X-zeolite, Y-zeolite and T-zeolite.

Further, kaolinite, halloysite, muscovite, montmorillonite, vermiculite, feldspar and other natural minerals, which are salts comprising various metal ions and aluminosilicic acid ions in which condensed silicic acid is partly substituted by aluminum, can also be used.

Furthermore, an alumino-silica gel represented by general formula $Al_2O_3 \cdot xSiO_2 \cdot yH_2O + Al(OH)_3$ can also be used.

In the present invention, these inorganic fine particles carrying silver and/or copper by ion exchange, adsorption or adherence are used. The coating film containing the fine particles carrying silver and/or copper subdivides molecules of a fuel such as gasoline or light oil, and further eliminates peroxide radicals produced in the course of oxidation of the fuel, thereby being able to prevent the oxidation reaction from proceeding.

The amount of silver and/or copper carried in ingredient (A) is usually preferably 1 to 12 parts by weight, and more preferably 2 to 8 parts by weight, based on 100 parts by weight of the inorganic fine particles. Less than 1 part by weight is unfavorable, because the power of preventing oxidation and the ability of subdividing the molecules, which are intended in the present invention, are too low. On the other hand, exceeding 12 parts by weight unfavorably results in elution of silver or copper.

The amount of these fine particles carrying (A) silver and/or copper contained in the coating agent is preferably 2 to 20 parts by weight, and more preferably 3 to 15 parts by weight, based on 100 parts by weight of the coating agent (in terms of solid content). When the amount is less than 2 parts by weight, the oxidation preventing effect and the molecule subdividing effect are little achieved. On the other hand, exceeding 20 parts by weight unfavorably results in too much increased viscosity of the coating agent or elution of silver and/or copper.

In order to allow such silver to be carried, a silver salt or colloidal silver is used. Specific examples of the silver salts include but are not limited to silver nitrate, silver sulfate, silver chloride and a diammine silver ion. One or more of them are dissolved in water, and used as a mixed aqueous solution. The aqueous silver salt solution can be applied to the above-mentioned carrier of the fine particles of ingredient (A) by ion exchange, adsorption or adherence. Colloidal silver has an average particle size of 3 to 100 m$\mu$, preferably 5 to 20 m$\mu$, and more preferably about 5 m$\mu$, and can be adsorbed by or adhered to the above-mentioned fine particles.

In order to allow copper to be carried, a copper salt is used. The copper salts include but are not limited to copper nitrate, copper sulfate and a tetraammine copper (II) ion. One or more of them are dissolved in water, and used as a mixed aqueous solution. The aqueous copper salt solution can be applied to the above-mentioned carrier of the fine particles of ingredient (A) by ion exchange, adsorption or adherence.

(B) Inorganic Fine Particles

The inorganic fine particles of ingredient (B) constituting the coating agent include fine particles or fibrous materials of silicon dioxide, aluminum silicate, calcium silicate, calcium magnesium silicate, calcium phosphate, magnesium silicate, zirconium silicate, mica, talc, kaolin, aluminum oxide, aluminum hydroxide, zinc oxide, zinc carbonate, barium carbonate, zinc hydroxide, titanium oxide whisker, iron oxide, zirconium oxide, zirconium hydroxide, calcium carbonate, silicon nitride, basic zinc molybdate, basic calcium molybdate, potassium titanate (whisker), tin oxide, silicate glass, a synthetic oxide, a silicate compound, a carbonate compound, carbon, strontium chromate, chromium oxide, nickel oxide, magnesium carbonate, silicon carbide and a natural mineral powder. These inorganic fine particles may be in a colloidal form, and suitably have an average particle size of about 0.01 to about 15 $\mu$m, preferably about 0.1 to about 10 $\mu$m.

Ingredient (B) is used for enhancing the subdivision of the fuel and oxidation prevention by enlargement of the surface area of the resulting coating film and ensurement of the film thickness, and further for improving impact resistance to better adhesion.

In the coating agent used in the present invention, the amount of the above-mentioned ingredient (B) is preferably 5 to 50 parts by weight, and more preferably 10 to 40 parts by weight, in terms of solid content, based on 100 parts by weight of the coating agent (in terms of solid content). When it is less than 5 parts by weight, the above-mentioned effects are not sufficient. On the other hand, exceeding 50 parts by weight is unfavorable, because adhesion is lowered, or the ratios of the other ingredients become too low.

(C) Binders

The coating agent of the present invention usually contains (C) a binder. The binder is preferably at least one selected from the group consisting of a synthetic resin, a metal alkoxide, a metal hydroxide, and a combination of an alkali metal salt and a curing agent, and may be a mixture of two or more of them.

Synthetic Resins;

The synthetic resins used as (C) the binder include but are not limited to at least one of solvent type, emulsion type, water-soluble type, moisture curing type, isocyanate curing type, powder type and ultraviolet ray curing type resins such as an acrylic resin, an alkyd resin, an amino resin, a phenol resin, an epoxy resin, a polyamide resin, a fluororesin, a polyisocyanate, a polyester resin, an acryl-modified urethane resin, a silicone resin and a silicone-acrylic resin. These synthetic resins form transparent or translucent films insoluble in gasoline or light oil, and are used for adhering ingredients (A) and (B) in the present invention.

The above-mentioned synthetic resins may be used either alone or as a mixture of two or more of them.

Metal Alkoxides and Metal Hydroxides;

Compounds represented by the following formulas (1) to (3) are exemplified as the metal alkoxides and metal hydroxides.

(1) A compound represented by $R^1_i M^1(OR^2)_j$, wherein $R^1$ indicates an alkyl group having 1 to 3 carbon atoms or a vinyl group, $R^2$ indicates a hydrogen atom, a methyl group, an ethyl group, an isopropyl group or a t-butyl group, $M^1$ indicates calcium or barium, i indicates an integer of 0 or 1, and j indicates an integer of 1 or 2.

(2) A compound represented by $R^3_k M^2(OR^4)_l$, wherein $R^3$ indicates an alkyl group having 1 to 3 carbon atoms or a vinyl group, $R^4$ indicates a hydrogen atom, a methyl group, an ethyl group, an isopropyl group or a t-butyl group, $M^2$ indicates aluminum, yttrium or lanthanum, k indicates an integer of 0 or 1, and l indicates an integer of 1, 2 or 3.

(3) A compound represented by $R^5_m M^3(OR^6)_n$, wherein $R^5$ indicates an alkyl group having 1 to 3 carbon atoms or a vinyl group, $R^6$ indicates a hydrogen atom, a methyl group, an ethyl group, an isopropyl group or a t-butyl group, $M^3$ indicates titanium, zirconium, manganese, tin, silicon or strontium, m indicates an integer of 0 or 1, and n indicates an integer of 3 or 4.

These compounds can be used either alone or as a combination of two or more of them. Further, they may be used as a condensate of two or more of them.

Specific examples of the above-mentioned metal alkoxides and metal hydroxides include $Ca(OCH_3)_2$, $Ca(OC_2H_5)_2$, $Ca(OC_3H_7)_2$, $Ca(OC_4H_9)_2$, $Ba(OCH_3)_2$, $Ba(OC_2H_5)_2$, $Ba(OC_3H_7)_2$, $Ba(OC_4H_9)_2$, $Al(OCH_3)_3$, $Al(OC_2H_5)_3$, $Al(OC_3H_7)_3$, $Al(OC_4H_9)_3$, $CH_3Al(OCH_3)_2$, $CH_3Al(OC_2H_5)_2$, $CH_3Al(OC_3H_7)_2$, $CH_3Al(OC_4H_9)_2$, $Ti(OCH_3)_4$, $Ti(OC_2H_5)_4$, $Ti(OC_3H_7)_4$, $Ti(OC_4H_9)_4$, $CH_3Ti(OCH_3)_3$, $CH_3Ti(OC_2H_5)_3$, $CH_3Ti(OC_3H_7)_3$, $CH_3Ti(OC_4H_9)_3$, $C_2H_5Ti(OCH_3)_3$, $C_2H_5Ti(OC_2H_5)_3$, $C_2H_5Ti(OC_3H_7)_3$, $C_2H_5Ti(OC_4H_9)_3$, $Si(OCH_3)_4$, $Si(OC_2H_5)_4$, $Si(OC_3H_7)_4$, $Si(OC_4H_9)_4$, $CH_3Si(OCH_3)_3$, $CH_3Si(OC_2H_5)_3$, $CH_3Si(OC_3H_7)_3$, $CH_3Si(OC_4H_9)_3$, $C_2H_5Si(OCH_3)_3$, $C_2H_5Si(OC_2H_5)_3$, $C_2H_5Si(OC_3H_7)_3$, $C_2H_5Si(OC_4H_9)_3$, $Zr(OCH_3)_4$, $Zr(OC_2H_5)_4$, $Zr(OC_3H_7)_4$, $Zr(OC_4H_9)_4$, $CH_3Zr(OCH_3)_3$, $CH_3Zr(OC_2H_5)_3$, $CH_3Zr(OC_3H_7)_3$, $CH_3Zr(OC_4H_9)_3$, $C_2H_5Zr(OCH_3)_3$, $C_2H_5Zr(OC_2H_5)_3$, $C_2H_5Zr(OC_3H_7)_3$, $C_2H_5Zr(OC_4H_9)_3$, $Y(OCH_3)_4$, $Y(OC_2H_5)_4$, $Y(OC_3H_7)_4$, $Y(OC_4H_9)_4$, $La(OCH_3)_4$, $La(OC_2H_5)_4$, $La(OC_3H_7)_4$, La(OC$_4$H$_9$)$_4$, Mn(OCH$_3$)$_4$, Mn(OC$_2$H$_5$)$_4$, Mn(OC$_3$H$_7$)$_4$, Mn(OC$_4$H$_9$)$_4$, Sn(OCH$_3$)$_4$, Sn(OC$_2$H$_5$)$_4$, Sn(OC$_3$H$_7$)$_4$, Sn(OC$_4$H$_9$)$_4$, Sr(OCH$_3$)$_4$, Sr(OC$_2$H$_5$)$_4$, Sr(OC$_3$H$_7$)$_4$, Sr(OC$_4$H$_9$)$_4$, Ca(OH)$_2$, Ba(OH)$_2$, Al(OH)$_3$, CH$_3$Al(OH)$_2$, Ti(OH)$_4$, CH$_3$Ti(OH)$_3$, C$_2$H$_5$Ti(OH)$_3$, Si(OH)$_4$, CH$_3$Si(OH)$_3$, C$_2$H$_5$Si(OH)$_3$, Zr(OH)$_4$, CH$_3$Zr(OH)$_3$, C$_2$H$_5$Zr(OH)$_3$, Y(OH)$_4$, La(OH)$_4$, Mn(OH)$_4$, Sn(OH)$_4$ and Sr(OH)$_4$.

Further, the condensate of these compounds can be obtained by freely condensing the above-mentioned compounds in any combination, and the molecular weight can also be appropriately selected. The condensates include, for example, ZrOSi(OC$_2$H$_5$)$_6$, AlOSi(OC$_2$H$_5$)$_6$, TiOSi(OC$_2$H$_5$)$_6$, (C$_3$H$_7$O)$_3$ZrOSi—(OC$_2$H$_5$)$_3$, (C$_4$H$_9$O)$_3$ZrOSi(OC$_2$H$_5$)$_3$, (C$_3$H$_7$O)$_3$TiOSi(OC$_2$H$_5$)$_3$, (C$_4$H$_9$O)$_3$TiOSi(OC$_2$H$_5$)$_3$, (C$_3$H$_7$O)$_2$AlOSi(OC$_2$H$_5$)$_3$ and (C$_4$H$_9$O)$_2$AlOSi—(OC$_2$H$_5$)$_3$.

Alkali Metal Salts and Curing Agents;

As for the combination of the alkali metal salt and the curing agent used as one of the binders, the alkali metal salt is a silicate represented by M$_2$O.pSiO$_2$.qH$_2$O (wherein M is Na, Li, K, Cs, NR$_3$ or NR$_4$ (wherein R is an alkyl group having 1 or more carbon atoms), p is a molar ratio (number of moles per mole of M$_2$O ), and q is an integer of 1 or more), and used in combination with the curing agent such as Zn, ZnO, MgO, CaO, Zn(OH)$_2$, Mg(OH)$_2$, Ca(OH)$_2$, AlPO$_4$, Al$_2$(PO$_3$)$_3$, H$_3$PO$_4$, H$_3$BO$_3$, MgCO$_3$, Al$_2$O$_3$ or SiO$_2$. The curing agent is not limited to them. They can be used either alone or as a combination of two or more of them.

Specific examples of the combinations include a combination of lithium silicate and magnesium oxide, a combination of sodium silicate and a condensed phosphate, a combination of potassium silicate, zinc and aluminum silicate, and a combination of a quaternary ammonium salt and magnesium carbonate.

As for the ratio of the curing agent to the silicate, the amount of the curing agent is preferably 5 to 100 parts by weight, and more preferably 10 to 50 parts by weight, based on 100 parts by weight of the silicate. Less than 5 parts by weight results in poor solvent resistance, hardness and adhesion, whereas exceeding 100 parts by weight unfavorably results in gelation.

The amount of (C) the binder used is preferably 7 to 40 parts by weight, and more preferably 10 to 30 parts by weight, in terms of solid content, based on 100 parts by weight of the coating agent (in terms of solid content). Less than 7 parts by weight results in poor adhesion and hardness, whereas exceeding 40 parts by weight unfavorably results in an increase in covering power, which causes insufficient expression of the performance and deterioration of impact resistance.

(D) Dispersing Media

In addition to the above-mentioned ingredients, (D) a dispersing medium such as an alcohol, another solvent or water can be used in the coating agent.

As the alcohol, there can be used a monohydric alcohol, ethylene glycol which is a dihydric alcohol, or a derivative thereof. Of these, a lower aliphatic alcohol having 1 to 5 carbon atoms is preferred as the monohydric alcohol. Specific examples thereof include methanol, ethanol, n-propyl alcohol, i-propyl alcohol, n-butyl alcohol, sec-butyl alcohol and t-butyl alcohol. Ethylene glycol and the derivatives thereof include ethylene glycol, ethylene glycol monobutyl ether and ethylene glycol monoethyl ether acetate.

Of these alcohols, preferred are i-propyl alcohol and n-butyl alcohol. These alcohols can be used either alone or as a combination of two or more of them.

The other solvents include hydrocarbons, ketones, esters and ethers such as xylene, toluene, mineral turpentine, benzene, cyclohexane and methyl ethyl ketone.

Further, as the water, there can be used common service water, distilled water or ion exchange water. In particular, when the coating agent is highly purified, distilled water or ion exchange water is preferred. The above-mentioned water and organic solvents are understood to include water or an organic solvent contained in the above-mentioned colloidal inorganic material, and water or an organic solvent produced by condensation caused by hydrolysis of the above-mentioned metal alkoxide or metal hydroxide.

The amount of (D) the dispersing medium contained in the coating agent used for the fuel tank of the present invention is preferably 25 to 75 parts by weight, and more preferably 30 to 60 parts by weight, based on 100 parts by weight of the coating agent (in terms of solid content). When the amount of (D) the dispersing medium used is less than 25 parts by weight, gelation of the coating agent takes place, or the viscosity of the coating agent increases, which causes poor workability. On the other hand, exceeding 75 parts by weight unfavorably results in difficulty in expressing the performance or deterioration of the stability of the coating agent.

(E) Additives

Further, (E) an additive can also be added as needed. As (E) the additive, there can be used a known additive such as a chelating agent, a surfactant, a coupling agent, an inorganic or organic acid, a dispersing agent, a thickener, a curing adjuster or an inorganic pigment, as needed.

The above-mentioned additives can be used in any amounts as long as the objects of the present invention are not impaired. The solid concentration of the coating agent is usually 25 to 75% by weight, and preferably 30 to 60% by weight. When the concentration is less than 25% by weight, the thickness of the resulting coating film is too thin, leading to decreases in the effect of preventing oxidation and the effect of subdividing molecules, or to a reduction in the strength of the coating film. On the other hand, exceeding 75% by weight unfavorably results in easy gelation, too much increased viscosity, deterioration of adhesion or poor leveling properties.

When the coating agent is prepared, the above-mentioned ingredients (A) to (D) or ingredients (A) to (E) are first mixed. In this case, ingredients (A) to (D) or ingredients (A) to (E) maybe concurrently mixed. An aqueous solution of a silver salt and/or a copper salt and the fine particles may be mixed with ingredients (B), (C) and (D), and further with ingredient (E), without allowing silver and/or copper to be previously carried on the fine particles in ingredient (A).

The coating agent used in the present invention is dispersed with a high-speed stirrer, a ball mill, a roll mill or another dispersing device and filtered, thereby being able to form a uniform stable dispersion.

Production of Fuel Tank

In order to produce the fuel tank of the present invention, the above-mentioned coating agent is applied onto an inner face of the fuel tank comprising a base material such as aluminum, iron, an alloy or an FRP, and dried and cured to form a coating film. It is better to increase the surface area of the base material by blast treatment or the like.

There is no particular limitation on the coating method of the above-mentioned coating agent, and, for example, coating means such as spraying, dipping and brushing can be employed. After coating, the coating film is dried and cured.

Although the coating proceeds at ordinary temperatures, heating at low temperatures shortens the gelation time and increases the polymerization density, thereby more densifying the coating film. The heating temperature is preferably 80 to 200° C. and more preferably about 100 to about 180° C. The heating time is preferably 10 to 100 minutes, and more preferably about 30 to about 60 minutes. In the case of less than 80° C., the curing time is scarcely shortened. On the other hand, exceeding 200° C. unfavorably affects the base material. The coating agent may be further applied after coating in one layer or a plurality of layers.

The amount of the coating agent applied to the base material is preferably 80 to 300 g/m², and more preferably 120 to 240 g/m², by dry weight. When the amount is less than 80 g/m², the coating film is too thin to express the intended performance. On the other hand, exceeding 300 g/m² unfavorably results in cracking or separation of the coating film.

The fuel tank of the present invention obtained as described above, which contains the fine particles carrying silver and/or copper in its coating film, decreases the cluster of molecules of the fuel contacted, makes finer the particle size of atomized fuel, and further inhibits enlargement of the cluster caused by rapid oxidation in the mixed gas or in the course at high temperatures, thereby being able to improve ignitionability and combustibility.

As for the fuel such as gasoline or light oil, oxidation proceeds by air or heat according to a radical chain reaction as described below, resulting in enlargement of the cluster.

RH→R•+•H

R•+O$_2$→ROO•

ROO•+RH→ROOH+R•

R•+O$_2$→ROO•

In the above-mentioned radical chain reaction, it is considered that a silver or copper ion in the coating film binds to an ROO• radical to form, for example, ROOAg, thus terminating the chain reaction.

In the above-mentioned reaction, RH indicates a hydrocarbon molecule, ROO• indicates a peroxide radical, and ROOH indicates a hydroperoxide.

As described above, the hydrocarbons constituting the fuel such as gasoline or light oil comes into contact with the coating agent containing silver and/or copper used in the present invention, and are excited to break hydrogen bonds, thereby decreasing the cluster of molecules, and further to eliminate the R• and ROO• radicals produced by the chain reaction of oxidation to prevent oxidation from proceeding, thereby inhibit enlargement of the cluster. That is to say, the fuel tank of the present invention decreases the cluster of the hydrocarbons constituting various fuels, and prevents their oxidation. In particular, this exhibits a profound effect under the conditions that thermal oxidation after atomization rapidly proceeds as the case of gasoline or light oil. When the hydrocarbons such as gasoline or light oil come into contact with the fuel tank of the present invention, finer particles of atomized hydrocarbons are obtained when they are atomized. Accordingly, the combustibility is improved to improve the efficiency of fuel consumption.

The fuel tank of the present invention inhibits oxidation of the fuel such as gasoline or light oil, and further decreases the cluster of gasoline or light oil to make finer the particle size of atomized fuel, thereby improving ignitionability and combustibility, which makes it possible to decrease imperfect combustion and to decrease substantially the consumption of the fuel.

The present invention will be illustrated in greater detail with reference to the following examples, but the invention should not be construed as being limited thereto.

In the examples, parts and percentages are expressed on a weight basis unless otherwise specified.

REFERENCE EXAMPLES 1 AND 2

Preparation of Coating Agents (1) and (2)

Two kinds of coating agents (1) and (2) shown in Table 1 were prepared. These coating agents were each prepared by placing ingredients (A) to (D) and further a leveling agent and acetic acid as needed in a stirring tank, mixing them by gentle stirring, stirring the resulting mixture with a high-speed stirrer at 15,000 rpm for 5 minutes, and filtering it through a 100-mesh filter.

TABLE 1

|  | Reference Example 1 | Reference Example 2 |
|---|---|---|
| Name of Coating Agent | (1) | (2) |
| Compounding Formulation (parts) |  |  |
| Ingredient (A) |  |  |
| A-1 | 120 | 40 |
| A-2 |  | 100 |
| Ingredient (B) |  |  |
| B-1 |  | 200 |
| B-2 | 30 | 20 |
| B-3 | 170 |  |
| B-4 | 40 | 20 |
| Ingredient (C) |  |  |
| C-1 |  | 350 |
| C-2 | 200 |  |
| C-3 | 50 |  |
| Solvent (D) |  |  |
| d-1: Isopropanol | 215 |  |
| d-2: Water | 160 | 267 |
| (E) |  |  |
| Leveling Agent | 5 | 3 |
| Acetic Acid | 10 |  |
| Total (parts) | 1,000 | 1,000 |
| Solid Concentration (%) | ca.47 | ca.50 |

A-1; Silver-carrying zeolite, average particle size: 3 µm, silver content: 7%
A-2; Silver-carrying titanium oxide, average particle size: 0.5 µm, silver content: 6%
B-1; Aluminium oxide, average particle size: 1.5 µm
B-2; Potassium titanate whisker, average particle size: 0.2 to 0.5 µm, length: 10 to 20 µm
B-3; Titanium oxide, average particle size: 0.5 µm
B-4; Aluminium oxide, average particle size: 0.02 µm,
C-1; Epoxy ester resin, EFD-5501 manufactured by Dianippon Ink & Chemicals, Incorporated, non-volatile matter content: 40 ± 1%
C-2; Methyltrimethoxysilane, KBM13 manufactured by Shim-Etsu Chemical Co., Ltd.
C-3; Acrylic silicon resin, KD-20 manufactured by Nippon NSC Co., Ltd., non-volatile matter content: 40 ± 1%
Leveling agent; Disparon 009 manufactured by Kusumoto Chemicals, Ltd.

EXAMPLES 1 TO 3 AND COMPARATIVE EXAMPLES 1 TO 3

In order to conduct practical tests for fuel tanks of the present invention, three motor vehicles A, B and C and fuel tanks for the respective motor vehicles shown in Table 2 were prepared.

TABLE 2

| Type of Vehicle | Name | Total Displacement (cc) | Kind of Fuel Oil Volume of Fuel Tank (L) | Total Mileage (km) |
|---|---|---|---|---|
| Small-sized passenger car | A | 1,496 | Regular gasoline | 18,660 |
| Fuel tank for the same | Tank A | — | 50 | — |
| Ordinary passenger car | B | 2,994 | Premium gasoline | 35,911 |
| Fuel tank for the same | Tank B | — | 70 | — |
| Small-sized freight car | C | 2,184 | Light Oil | 68,305 |
| Fuel tank for the same | Tank C | — | 50 | — |

Then, inner faces of tanks A, B and C were each coated with coating agents shown in Table 1 by air spraying under conditions shown in Table 3.

In Table 3, the amount coated is a value converted to solid content.

TABLE 3

| Name of Fuel Tank | Name of Coating Agent | Amount Coated (g/m²) | Drying Method | Name after Processing |
|---|---|---|---|---|
| Tank A | (2) | ca. 55 | 70° C. hot air, 60 min | A Tank |
| Tank B | (1) | ca. 75 | 80° C. hot air, 60 min | B Tank |
| Tank C | (1) | ca. 60 | 80° C. hot air, 60 min | C Tank |

Practical Tests:

The amount of hydrocarbons (HC) in idling was measured, and then, running tests were conducted for about one month in order to examine the fuel consumption. The measurement of hydrocarbons (HC) in idling was made with a MEXA-9400 type tester manufactured by Horiba Seisakusho Co., Ltd.

First, tests of motor vehicles A, B and C were conducted as controls (Comparative Examples 1 to 3).

Next, the fuel tanks of motor vehicles A, B and C were each replaced by A tank, B tank and C tank, respectively, and similar tests were conducted (Examples 1 to 3).

Results thereof are shown in Table 4.

TABLE 4

| | Type of Vehicle | Measured Value of Hydrocarbons in Idling (ppm) | Mileage for About 1 Month (km) | Fuel Consumption (L) | Mileage per L (km) |
|---|---|---|---|---|---|
| Comparative Example 1 | A | 23.1 | 3,319 | 206 | 16.1 |
| Example 1 | A—A tank | 2.14 | 3,543 | 178 | 19.9 |
| Comparative Example 2 | B | 24.9 | 4,207 | 452 | 9.3 |
| Example 2 | B—B tank | 2.16 | 4,155 | 331 | 12.4 |
| Comparative Example 3 | C | 13.8 | 4,182 | 271 | 15.4 |
| Example 3 | C—C tank | 11.2 | 4,983 | 289 | 17.2 |

As apparent from Table 4, the use of the fuel tanks of the present invention (Examples 1 and 2) reduced the amount of hydrocarbons produced in idling to 10% or less, compared to the control motor vehicles (Comparative Examples 1 and 2), in the case of the gasoline cars (A and B), and resulted in a 18 to 25% decrease in fuel consumption.

Further, in the case of the diesel car C, the amount of hydrocarbons was decreased by a little less than 20%, and the fuel consumption was decreased by about 10% (Example 3). However, the control motor vehicle (Comparative Example 3) necessarily emitted black smoke when it ran uphill with freight loaded. In contrast, the motor vehicle having the fuel tank of the present invention (Example 3) emitted no black smoke at all.

What is claimed is:

1. A fuel tank for a motor vehicle comprising a coating film disposed on an inner face of said fuel tank, wherein said coating film consists of with an inorganic coating agent comprising (A) fine particles carrying silver and/or copper and (B) inorganic fine particles, further comprising (C) at least one synthetic resin binder selected from the group consisting of an acrylic resin, an alkyd resin, an amino resin, a phenol resin, an epoxy resin, a polyamide resin, a fluororesin, a polyisocyanate, a polyester resin, an acryl-modified urethane resin, a silicone resin, and a silicone-acrylic resin, said inorganic coating agent having been dried and cured at a temperature of 80 to 200° C. for 10 to 100 minutes.

2. The fuel tank according to claim 1, wherein the content of ingredient (C) is 7 to 40 parts by weight, in terms of solid content, based on 100 parts by weight of the coating agent (in terms of solid content).

3. The fuel tank according to claim 1, wherein the fine particles carrying silver and/or copper are at least one selected from the group consisting of an aluminosilicate, a phosphate, a silicate, a carbonate, a metal oxide, a metal hydroxide, a metal nitride and a metal carbide.

4. The fuel tank according to claim 3, wherein the content of ingredient (A) is 2 to 20 parts by weight based on 100 parts by weight of the inorganic coating agent (in terms of solid content).

5. A method for producing a fuel tank for a motor vehicle, which comprises applying the inorganic coating agent according to claim 3 onto an inner face of the fuel tank, followed by drying and curing.

6. The fuel tank according to claim 1, wherein the content of ingredient (A) is 2 to 20 parts by weight based on 100 parts by weight of the inorganic coating agent (in terms of solid content).

7. A method for producing a fuel tank for a motor vehicle, which comprises applying the inorganic coating agent according to claim 6 onto an inner face of the fuel tank, followed by drying and curing.

8. The fuel tank according to claim 1, wherein ingredient (B) is fine particles or a fibrous material of at least one selected from the group consisting of silicon dioxide, aluminum silicate, calcium silicate, calcium magnesium silicate, calcium phosphate, magnesium silicate, zirconium silicate, mica, talc, kaolin, aluminum oxide, aluminum hydroxide, zinc oxide, zinc carbonate, barium carbonate, zinc hydroxide, titanium oxide whisker, iron oxide, zirconium oxide, zirconium hydroxide, calcium carbonate, silicon nitride, basic zinc molybdate, basic calcium molybdate, potassium titanate (whisker), tin oxide, silicate glass, a synthetic oxide, a silicate compound, a carbonate compound, carbon, strontium chromate, chromium oxide, nickel oxide, magnesium carbonate, silicon carbide and a natural mineral powder.

9. A method for producing a fuel tank for a motor vehicle, which comprises applying the inorganic coating agent according to claim 8 onto an inner face of the fuel tank, followed by drying and curing.

10. The fuel tank according to claim 1, wherein the content of ingredient (B) is 5 to 50 parts by weight, in terms of solid content, based on 100 parts by weight of the coating agent (in terms of solid content).

11. A method for producing a fuel tank for a motor vehicle, which comprises applying the inorganic coating agent according to claim 10 onto an inner face of the fuel tank, followed by drying and curing.

12. The fuel tank according to claim 1, wherein the inorganic coating agent contains (D) a dispersing medium.

13. The fuel tank according to claim 12, wherein (D) the dispersing agent is water and/or an organic solvent.

14. The fuel tank according to claim 12, wherein the content of (D) the dispersing agent is 25 to 75 parts by weight, in terms of solid content, based on 100 parts by weight of the coating agent (in terms of solid content).

15. A method for producing a fuel tank for a motor vehicle, which comprises applying the inorganic coating agent according to claim 1 onto an inner face of the fuel tank, followed by drying and curing.

16. The method according to claim 15, wherein the amount of the coating agent applied is 80 to 300 g/m$^2$ by dry weight.

17. A method for producing a fuel tank for a motor vehicle, according to claim 15, wherein the content of ingredient (C) is 7 to 40 parts by weight, in terms of solid content, based on 100 parts by weight of the coating agent (in terms of solid content).

* * * * *